C. C. COMSTOCK.
Lumber Wagon.
No 61,808.  Patented Feb. 5, 1867.
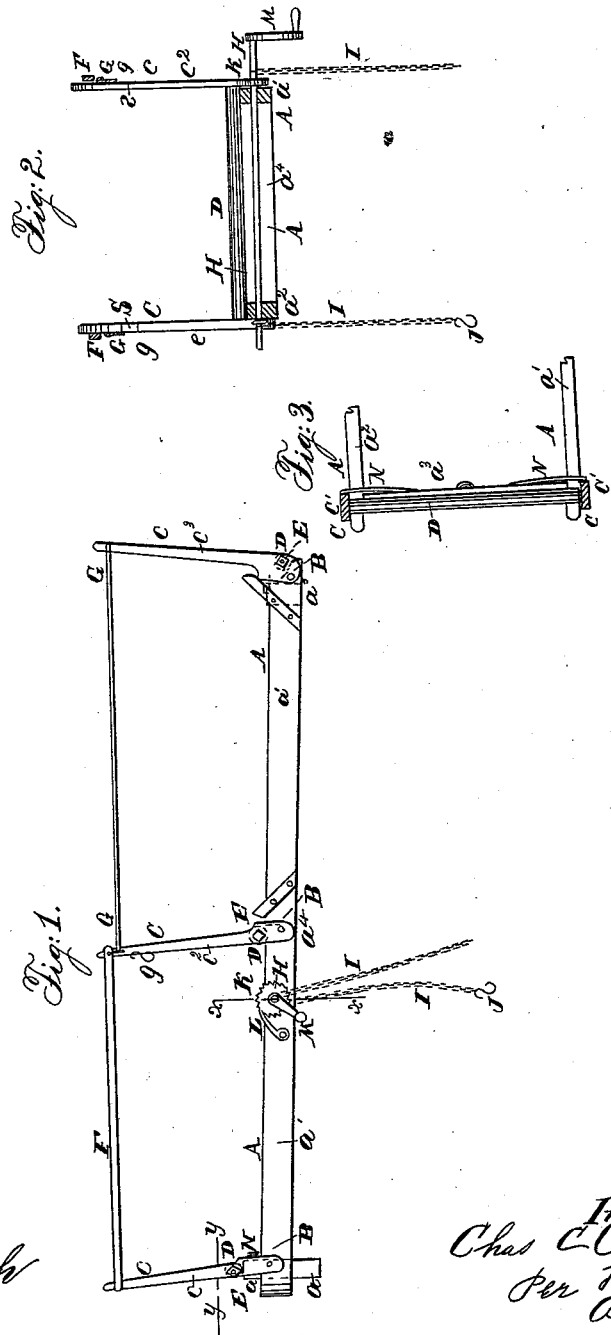

United States Patent Office.

CHARLES C. COMSTOCK, OF GRAND RAPIDS, MICHIGAN.

Letters Patent No. 61,808, dated February 5, 1867.

---

IMPROVEMENT IN LUMBER RACK FOR WAGONS.

---

The Schedule referred to in these Letters Patent and making part of the same.

---

TO ALL WHOM IT MAY CONCERN:

Be it known that I, CHARLES C. COMSTOCK, of Grand Rapids, in the county of Kent, and State of Michigan, have invented a new and useful Improvement in Lumber Rack; and I do hereby declare that the following is a full, clear, and exact description thereof, which will enable others skilled in the art to make and use the same, reference being had to the accompanying drawings, forming part of this specification, in which—

Figure 1 is a side view of my improved lumber rack.

Figure 2 is a vertical cross-section of the same, taken through the line $x\,x$, fig. 1.

Figure 3 is a detail sectional view of the same, taken through the line $y\,y$, fig. 1.

Similar letters of reference indicate like parts.

My invention has for its object to furnish an improved rack, so constructed and arranged that by its use lumber may be conveniently loaded upon and unloaded from the wagon; and it consists in the combination of the lever stakes and rollers with each other and with the frame of the rack, for the purpose of forming an inclined plane of rollers for convenience in loading and unloading the lumber; in the combination of the connecting-bars, ropes, chains, crank-shaft, and spring with the lever stakes and with the frame of the rack, for the purpose of operating the lever stakes and of binding the load; the whole being constructed and arranged as hereinafter more fully described.

In the following description, the dimensions given are suggested as suitable for a rack for ordinary purposes, but they may be varied as the circumstances under which the rack is to be used may render it expedient.

A is the frame of the rack, consisting of the two side pieces $a^1$ and $a^2$ and the three bolsters $a^3\,a^4\,a^5$. The side pieces $a^1$ and $a^2$ are ten feet and two inches in length, two and a half inches wide, and nine inches deep at the front end, and seven inches deep at the rear end. The front bolster $a^3$ is three feet two inches long, four inches wide, and twenty inches deep; the middle bolster $a^4$ is three feet two inches long, three inches wide, and eight inches deep, and the rear bolster $a^5$ is three feet two inches long, four inches wide, and five inches deep. In use, the front and rear bolsters $a^3$ and $a^5$ of the frame A take the places of the front and rear bolsters of an ordinary wagon. C are the lever stakes, which may be pivoted to the frame A by iron rods B one inch in diameter, passing through the said stakes and through the frame A, or by screwbolts, as may be convenient. The front and middle pairs of stakes, $c^1$ and $c^2$, are of the same dimensions and form; they are four feet long, one and three-fourths inch thick, and six inches broad at the lower end, and three inches at the upper end. The rear pair of stakes $c^3$ are four feet six inches long, one and three-fourths inch thick, and nine inches wide at the lower end, and three inches at the upper end. D are rollers five inches in diameter, pivoted between each pair of stakes by iron rods, E, one and one-fourth inch in diameter, passing longitudinally through the said rollers D and through the stakes, being secured in place by nuts and washers in the ordinary manner. The rollers D are pivoted to the stakes C in such a position that when the said stakes are in the position shown in fig. 1, the sides of the forward and middle rollers D will be in contact with and rest upon the upper surface of the bolsters $a^3$ and $a^4$, and the upper side of the rear roller D will be lower than the upper side of the bolster $a^5$, so that the rear part of the load may rest directly upon the said bolster $a^5$; but when the lever stakes $c^1$ and $c^2$ are drawn back, and the rear stakes $c^3$ drawn forward, in the manner hereinafter described, the rollers D are raised above the bolsters, so that they can revolve and carry the lumber forward or backward in loading or unloading the wagon. To enable this to be done, the rods or bolts B, by which the forward and middle pairs of lever stakes $c^1$ and $c^2$ are pivoted to the frame A, should be placed below, and about two inches in the rear of the rods E, which pivot the rollers D to said stakes, and the rod or bolts B, by which the rear stakes $c^3$ are pivoted to the frame A, should be placed below and about five inches in front of the said rod E, as shown in fig. 1. F are bars connecting and pivoted to the upper ends of the lever stakes $c^1$ and $c^2$ on each side of the rack, so that the said stakes when operated may move together. These bars F are one inch thick, and two inches wide. G are ropes, the rear ends of which are attached to the upper ends of the rear stakes $c^3$, thence they pass through staples or over pulleys attached to the upper parts of the middle stakes $c^2$, and to their free ends are attached grab-hooks $g'$. The ropes G should be about five-eighths of an inch in diameter, and they should be a little longer than the horizontal distance between the stakes $c^2$ and $c^3$. H is an iron shaft, one and three-eighths inch in diameter, which works in bearings in the side pieces $a^1$ and $a^2$ of the frame A. The ends of the shaft H project beyond the said side pieces, and to them are attached the ends of the small cable chains I. These chains I are about seven feet in length, and one of them terminates in a grab-hook, J. K is a ratchet-wheel attached to the projecting part of the shaft H, upon the teeth of which the pawl L takes hold and holds the shaft securely in the position to which it has been revolved. M is a crank attached to the end of the shaft H, and by means of which the said shaft is operated. In using the rack, the grab-hooks $g'$ are hooked upon the chains I, and the shaft H revolved. This draws the front and middle stakes backward and the rear stakes forward, which raises the bolsters D into position to revolve, and at the same time to sustain the load; the lumber is then run in from the rear end of the wagon. P are braces or stops attached to the side pieces $a^1$ and $a^2$ of the frame A in such a position as to stop the lever stakes C when they have been moved sufficiently to raise the rollers D away from the bolster $a^3 a^4 a^5$. When the rack is loaded the grab-hooks $g'$ are unhooked; this allows the rear stakes to be forced back to their former position by the lumber, and at the same time the forward and middle stakes are drawn forward to their former position by the spring N attached to the rear side of the upper part of the forward bolster $a^3$, and the ends of which rest against the rear edges of the forward stakes $c^1$, as shown in figs. 1 and 3. The chains I are then passed over the load, and the grab-hook J, of the one chain, hooked into a link of the other, and by turning the crank M the load is securely bound. In unloading the load is unbound, the chains I hooked upon the grab-hooks $g'$, and the rollers D raised in the manner before described; this allows the lumber to be readily run out at the rear end of the wagon.

What I claim as new, and desire to secure by Letters Patent, is—

1. The combination of the lever stakes C and rollers D with each other and with the frame A of the rack, substantially as herein shown and described.

2. The combination of the connecting-bars F, ropes G, chains I, crank N, shaft H, and spring N with the lever stakes C and with the frame A of the rack, substantially as herein shown and described.

3. The combination of the shaft H and chains I with the frame A of the rack, for the purpose of binding the load, substantially as shown and described.

CHARLES C. COMSTOCK.

Witnesses:
S. A. HOGEBOOM,
JOHN W. CHAMPLIN.